June 27, 1961 J. C. TERRY 2,990,146
AIRCRAFT ARRESTING MEANS
Filed Oct. 15, 1958
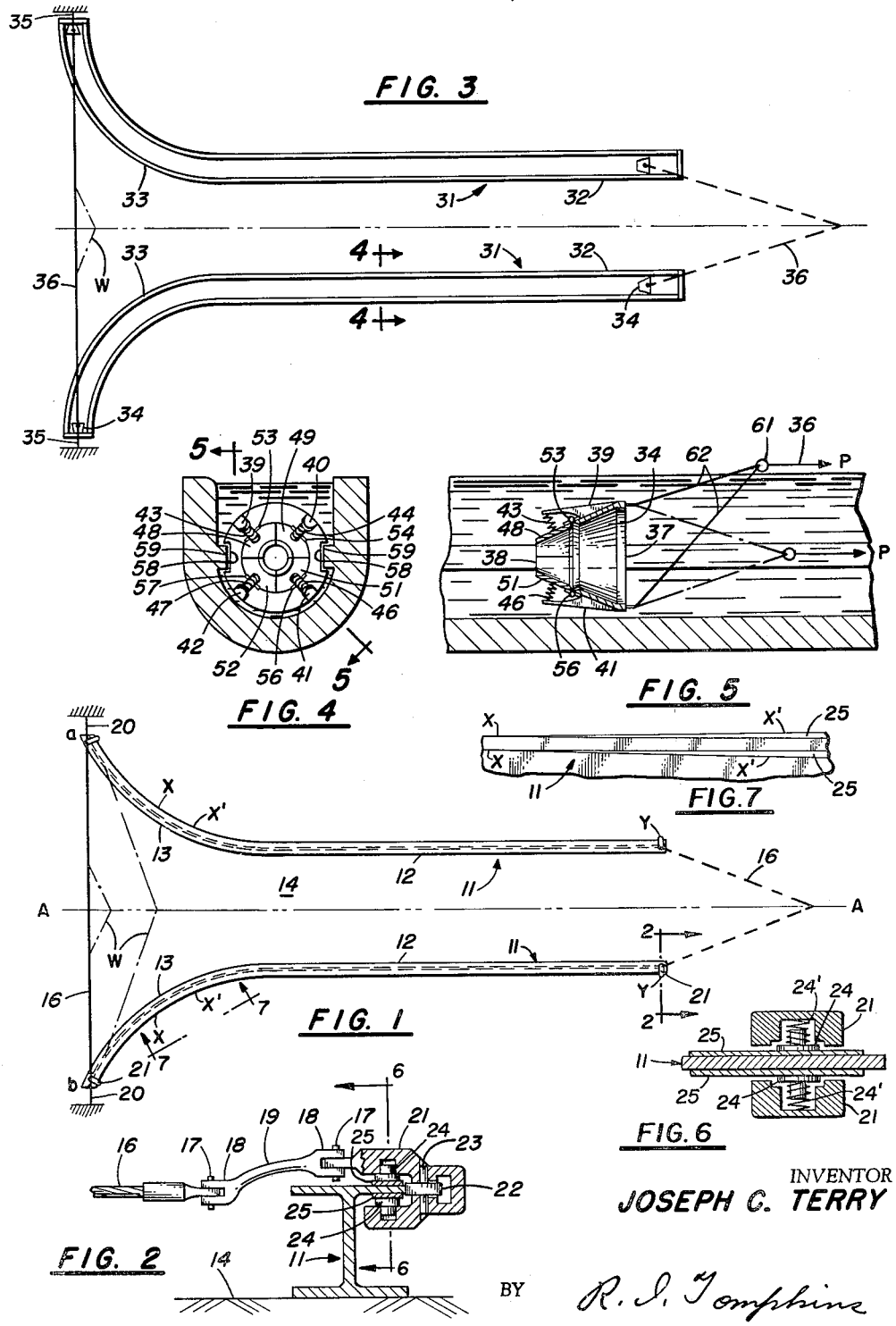
INVENTOR
JOSEPH C. TERRY

United States Patent Office 2,990,146
Patented June 27, 1961

2,990,146
AIRCRAFT ARRESTING MEANS
Joseph C. Terry, 102 Lynnmoor Drive, Silver Spring, Md.
Filed Oct. 15, 1958, Ser. No. 767,494
3 Claims. (Cl. 244—110)
(Granted under Title 35, U.S. Code (1952), sec. 266)

The invention described herein may be manufactured and used by or for the Government of the United States of America for governmental purposes without the payment of any royalties thereon or therefor.

The present invention relates to aircraft arresting means whereby aircraft may be safely landed in a restricted area.

More particularly, the present invention relates to apparatus comprising a flexible tension member stretched transverse to the path of travel of a landing craft to coact with engaging means on the aircraft, said tension member being secured at each end to retarding means, and said retarding means being movable along constrained curved paths.

One of the objects of the present invention is to provide arresting gear of extreme simplicity and reliability and adaptable to use with aircraft having a variety of landing speeds, these speeds also being of high magnitude.

Another object is to reduce the length of landing strip required to bring the aircraft to rest.

A further object is to design an arresting gear in which no pulleys or sheaves are required over which to pass the flexible cable and to eliminate thereby the additional disturbance waves in the cable caused by such pulleys.

Still another object is to provide means by which a controllable, programmed retardation force may be applied to a moving aircraft which has engaged the flexible cable.

Other objects and many of the attendant advantages of this invention will be readily appreciated as the same becomes better understood by reference to the following detailed description when considered in connection with the accompanying drawings wherein:

FIG. 1 is a top plan view of the preferred embodiment showing a pair of curved rails providing the curved paths with the cable and retarding bodies in their initial and final positions during landing of the aircraft;

FIG. 2 is taken on line 2—2 of FIG. 1 and shows a section through the rail chosen to represent the curved path and restraining body suggested in the preferred embodiment;

FIG. 3 is a top plan view of one embodiment showing a pair of fluid troughs with the cable and retarding bodies in a variety of positions during landing of the aircraft;

FIG. 4 shows a section taken on line 4—4 of FIG. 3;
FIG. 5 shows a section taken on line 5—5 of FIG. 4;
FIG. 6 represents a section taken on line 6—6 of FIG. 2; and
FIG. 7 shows a partial elevation of the top flange of one of the curved rails for length 7—7 of FIG. 1.

Referring to the drawings in detail and with particular reference to FIGS. 1 and 2, there is shown a pair of steel rails 11—11 of conventional I-beam of wide flange cross-section each of which has an elongated straight portion 12 and a curved end 13. These rails 11 are arranged to either side of center line A—A with curved ends 13 converging on center line A—A and straight portions 12 parallel to one another. Rails 11 are securely fastened to landing or other surface 14 providing curved paths or tracks.

Preparatory to an arrest the tension member, flexible steel or fibre cable 16 is stretched taut between points $a$ and $b$ at the widely spaced ends of curved portions 13 of rails 11. At both ends of cable 16, said cable is pivotally secured by means of pins 17—17 and clevises 18—18 on either end of curved link 19 to movable resistance means such as bogeys 21 which are mounted for travel on that portion of the upper flange of rails 11 facing away from center line A—A. A guide roller 22 is arranged in bogey 21 on vertical axle 23 to facilitate movement of each bogey laterally along the upper flange of each rail 11. Also mounted in bogey 21 to enable bogey 21 to resist movement along rail 11 are two brake buttons or pucks 24—24 arranged facing one another and slidably movable toward and away from each other being forced toward each other by springs 24'—24'. The upper flange of rail 11 is interposed between the brake buttons 24—24 which slide easily thereover upon relative movement between rail 11 and bogey 21.

Conventional means such as toggles or shear connectors 20—20 are employed to hold cable 16 taut preparatory to an arrest. These shear connectors 20—20 also provide for immediate release upon the engagement of cable 16 by the aircraft. Other means (not shown) constructed of materials capable of withstanding loads in tension may be inserted between the ends of the flexible cable and its pivotal attachment to the bogeys. The purpose of these latter materials is to vary in optimum fashion the modulus of elasticity of the flexible cable system where utilized.

Fastened, as by welding or bolting, to the upper and lower surfaces of upper flanges of rails 11 between some point X on the curved end 13 and point Y near the far end of straight portion 12 are tapered elements 25—25, two to each rail 11. Between some points such as X' and point Y, elements 25 are (in this embodiment) of constant thickness while from point X' to point X these elements 25 taper to zero thickness. Though a uniform taper is shown in FIG. 7 the taper can be effected at a programmed rate depending on the rate and extent of retardation desired. In a particular case it may be desirable for point X' to be located further along rail 11 perhaps even far enough to coincide with point Y. In the latter case, of course, tapered elements 25 will increase in thickness from zero thickness at point X to some finite thickness at point Y at a programmed rate. As bogey 21 is moved along the rail 11 from its initial position to point X it moves freely, then brake buttons 24—24 engage tapered elements 25—25 and as the thicknesses of the tapered elements 25—25 increase, the resistance to movement of the bogey 21 increases due to increasing friction forces between the tapered elements 25—25 and brake buttons 24—24, brake buttons 24 being forced toward each other by springs 24'—24'.

The arrest is made upon engagement of cable 16 by the arresting hook (not shown) of the aircraft (not shown), as is common practice. One of the features of this device is the elimination of pulleys or sheaves over which such flexible cables as cable 16 usually pass in many present arresting systems. Such pulleys have adverse effect upon transient loads imposed on the retardation system and the aircraft by adding to the disturbance caused by the cable wave W.

In the present invention, however, initial impact stress in cable 16 causes the immediate release of shear connectors 20—20 followed by the movement of the bogeys 21—21 along the curved ends 13—13 as a function of the cable motion inwardly toward center line A—A, the path of the aircraft in lieu of sheave rotation. At such time as the physical disturbance or kink wave W in the cable reaches the bogey 21, the bogey 21 is in motion causing thereby a reduction in the stress-producing impulse. At this instant, the bogey will have reached a point on the curved path where the angularity of the cable's transverse motion will approximate a tangent to the curved path. The resulting impulse produces even greater motion of freely moving bogey 21. The importance of this type and magnitude of motion of bogey 21 is that thereby a forced reduction of stress in flexible cable 16 is achieved by slackening the tautness of cable 16. At this instant point X is reached and the retardation force begins to be applied by the freely moving bogeys 21 through brake buttons 24 forced into contact with tapered elements 25 by springs 24'.

Most generally the curved end 13 is an arc of a circle but depending upon the breadth of the range of landing speeds of the aircraft to be arrested, the particular curvature may be varied from a circular arc.

Thus, subsequent to the engagement of cable 16 and the arresting hook (not shown) of the aircraft (not shown), bogeys 21—21 move freely from points a—b to points X—X. The initial stresses imposed on the system by impact on the flexible cable 16 are attenuated by the ability of bogeys 21 to move and thereby slacken the tautness of cable 16. From points X to points Y two important conditions are imposed on the system as the bogeys 21—21 continue to be moved along the constrained curved path under the influence of the moving aircraft; first, the retardation forces acting on the bogeys 21—21 gradually increase; and second, the angle between the portions of cable 16 to either side of the arresting hook continues to decrease until the bogeys have reached straight portion 12.

In this manner the vibrating stresses due to impact are minimized; the retardation forces are brought more directly behind the moving aircraft and the controllable, programmed retardation forces bring the aircraft to rest.

A variation of the present invention is illustrated in FIGS. 3, 4 and 5 wherein open troughs 31—31 containing fluid, such as water, are employed instead of the steel rails of the preferred embodiments to provide a constrained curved path. These troughs 31—31 each have a curved end 33 and a straight portion 32. Buckets 34—34 are employed as the movable resistance means in this embodiment and are attached to either end of cable 36 and submerged in the fluid in troughs 31—31, cable 36 being held taut by conventional shear connectors 35—35. Each bucket 34 is shaped like the hollow frustum of a right circular cone having a large open inlet end 37 and a smaller open outlet end 38 through which the fluid passes as the bucket 34 is pulled along trough 31. A plurality of rigid arms 39, 40, 41, 42 provide resistance for the action of biasing springs 43, 44, 46, 47 upon bucket segments 48, 49, 51, 52. These bucket segments are pivotally movable about hinges 53, 54, 56, 57 whenever the force of the fluid passing through bucket 34 is sufficiently great to overcome the force of the biasing springs. Slots 58—58 are provided, one on either side of each bucket 34 within which are located ways 59—59 to guide the movement of each moving body, bucket 34, in its constrained curved path through the fluid medium in trough 31.

Each bucket 34 is connected to cable 36 by means of a ring 61 freely movable on bridle cable 62 to allow for changes in direction of the application of force P.

In operation, the resistance to motion of bucket 34 through the fluid medium is transmitted to the aircraft through cable 36 and brings the aircraft to rest.

The amount of resistance force generated by each bucket 34 is dependent upon its velocity through the fluid. Thus, since the bucket 34 moves substantially transverse to the path of movement of the aircraft its initial velocity will be low and it moves freely through the fluid. As the bucket 34 moves further around curved end 33 its velocity is gradually increased, more resistance is generated and at the same time this force is applied more and more directly behind the moving aircraft as the angle between the portions of cable 36 to either side of the arresting hook on the aircraft decreases. Should the resistance increase to a given amount the force of the fluid on bucket segments 48, 49, 51, 52 will overcome the biasing force of springs 43, 44, 46, 47 thereby increasing the area of outlet end 38 whereby too rapid deceleration of the aircraft is prevented.

Obviously many modifications and variations of the present invention are possible in the light of the above teachings. It is therefore to be understood that within the scope of the appended claims the invention may be practiced otherwise than as specifically described.

What is claimed is:

1. An aircraft arresting unit comprising at least one pair of movable resistance means, at least one pair of parallel paths in spaced relation to each other, each of which have extended straight portions and a curved section at one end of each path curving outwardly from one another, said movable resistance means being arranged to move along said pair of paths, and a tensioning member between said resistance means to be engaged by an aircraft whereby said resistance means which initially reside at the end of the curved portions of the paths are pulled along said paths proceeding from said curved portion along said straight portion with said resistance means and said tracks coacting to develop a programmed retardation force to decelerate said aircraft.

2. The aircraft arresting unit of claim 1 in which the paths are wedge-shaped tracks with the thin end of the wedge constituting the major segment of the curved portion of each track and with the track increasing in thickness proceeding from said curved portion along the straight portion of the track.

3. The aircraft arresting unit of claim 2 in which the movable resistance means are bogeys having brake buttons to coact with the wedge-shaped track whereby the retardation force becomes increasingly greater during the deceleration of said aircraft.

References Cited in the file of this patent

UNITED STATES PATENTS

| | | |
|---|---|---|
| 1,488,572 | Vroom | Apr. 1, 1924 |
| 1,836,010 | Audrain | Dec. 15, 1931 |
| 1,925,212 | Steiber | Sept. 5, 1933 |
| 2,240,947 | Wilson | May 6, 1941 |
| 2,375,443 | Sarchet | May 8, 1945 |
| 2,483,655 | Schultz | Oct. 4, 1949 |
| 2,583,125 | Shannon | Jan. 22, 1952 |
| 2,777,653 | Cotton et al. | Jan. 15, 1957 |